United States Patent
Borucki et al.

(10) Patent No.: US 10,726,461 B2
(45) Date of Patent: Jul. 28, 2020

(54) SYSTEM AND METHOD OF COMPLETING AN ACTIVITY VIA AN AGENT

(71) Applicant: NCR Corporation, Duluth, GA (US)

(72) Inventors: Robert Thomas Borucki, Mesa, AZ (US); John Bruno, Mahwah, NJ (US)

(73) Assignee: NCR Corporation, Atlanta, GA (US)

( * ) Notice: Subject to any disclaimer, the term of this patent is extended or adjusted under 35 U.S.C. 154(b) by 1006 days.

(21) Appl. No.: 14/208,956

(22) Filed: Mar. 13, 2014

(65) Prior Publication Data
US 2014/0278605 A1    Sep. 18, 2014

Related U.S. Application Data

(60) Provisional application No. 61/792,815, filed on Mar. 15, 2013.

(51) Int. Cl.
| | | |
|---|---|---|
| G06Q 30/06 | (2012.01) | |
| G06Q 10/02 | (2012.01) | |
| G06F 3/0481 | (2013.01) | |
| G06F 9/451 | (2018.01) | |
| H04L 29/06 | (2006.01) | |

(52) U.S. Cl.
CPC ....... *G06Q 30/0617* (2013.01); *G06F 3/0481* (2013.01); *G06F 9/451* (2018.02); *G06Q 10/02* (2013.01); *H04L 67/38* (2013.01)

(58) Field of Classification Search
CPC ..... G06T 13/40; G06T 11/00; G06T 2213/12; G06Q 10/02; G06Q 50/14; G06Q 30/0617; G06F 3/017; G06F 3/04817; G06F 9/4446; G06F 9/453; G06F 3/0481; G06F 9/451; H04N 21/4788; H04N 21/42207; H04N 7/157; G09B 5/065; G06K 9/00315; H04L 67/38
See application file for complete search history.

(56) References Cited

U.S. PATENT DOCUMENTS

| | | | | |
|---|---|---|---|---|
| 5,657,462 | A | * | 8/1997 | Brouwer ............. G06F 3/04895 715/202 |
| 6,388,665 | B1 | * | 5/2002 | Linnett ............... G06F 3/04817 345/473 |
| 8,949,725 | B1 | * | 2/2015 | Goncharuk .......... G06Q 10/107 715/758 |

(Continued)

OTHER PUBLICATIONS

Wikipedia entry for 'Pictogram' <https://en.wikipedia.org/wiki/Pictogram> (captured using Wayback Machine <http://web.archive.org/web/20110203191531/https://en.wikipedia.org/wiki/Pictogram> on Feb. 3, 2011). (Year: 2011).*

(Continued)

*Primary Examiner* — Michael P Harrington
*Assistant Examiner* — Brian A Tallman
(74) *Attorney, Agent, or Firm* — Schwegman, Lundberg & Woessner

(57) ABSTRACT

A system and method of completing an activity via an agent. The agent is embodied as agent software, which facilitates and/or performs activities on behalf of a user. The agent software may have a characteristic persona that it presents to the user in the form of an avatar on a display. The agent software may be part of a computer program stored in a memory and executed by a processor of a smartphone or other computer.

11 Claims, 9 Drawing Sheets

(56) References Cited

U.S. PATENT DOCUMENTS

| | | | | |
|---|---|---|---|---|
| 2002/0008716 | A1* | 1/2002 | Colburn | G06T 13/40 715/706 |
| 2002/0140718 | A1* | 10/2002 | Yan | G10L 21/06 715/706 |
| 2003/0065524 | A1* | 4/2003 | Giacchetti | A45D 44/005 700/49 |
| 2005/0267778 | A1* | 12/2005 | Kazman | G06Q 10/00 705/26.1 |
| 2006/0134585 | A1* | 6/2006 | Adamo-Villani | G09B 5/02 434/112 |
| 2008/0020361 | A1* | 1/2008 | Kron | G09B 23/28 434/262 |
| 2008/0221892 | A1* | 9/2008 | Nathan | G06F 17/279 704/257 |
| 2009/0007346 | A1* | 1/2009 | Ha | D06F 33/02 8/159 |
| 2009/0216691 | A1* | 8/2009 | Borzestowski | G06F 17/3066 706/11 |
| 2010/0010885 | A1* | 1/2010 | Hill | G06Q 20/102 705/14.15 |
| 2010/0017314 | A1* | 1/2010 | Johnson | G06Q 10/025 705/30 |
| 2011/0119582 | A1* | 5/2011 | Bhatt | G06Q 30/02 715/708 |
| 2013/0080290 | A1* | 3/2013 | Kamm | G06Q 30/0281 705/26.61 |
| 2014/0074454 | A1* | 3/2014 | Brown | G16H 10/60 704/9 |
| 2014/0253819 | A1* | 9/2014 | Walton | G06Q 30/06 348/789 |

OTHER PUBLICATIONS

Dictionary.com avatar definition <https://www.dictionary.com/browse/avatar> (Year: 2019).*

Li, Manning et al., "Advisory services in the virtual world: an empowerment perspective", (Feb. 16, 2012), Springer Science+Business Media, LLC., Electron Commer Res (2012) 12:54-96. (Year: 2012).*

Kethuneni, Sukhanya et al., "Personal Healthcare Assistant/Companion in Virtual World", (2009), AAAI Publications, Papers from the AAAI Fall Symposium (FS-09-07). (Year: 2009).*

* cited by examiner

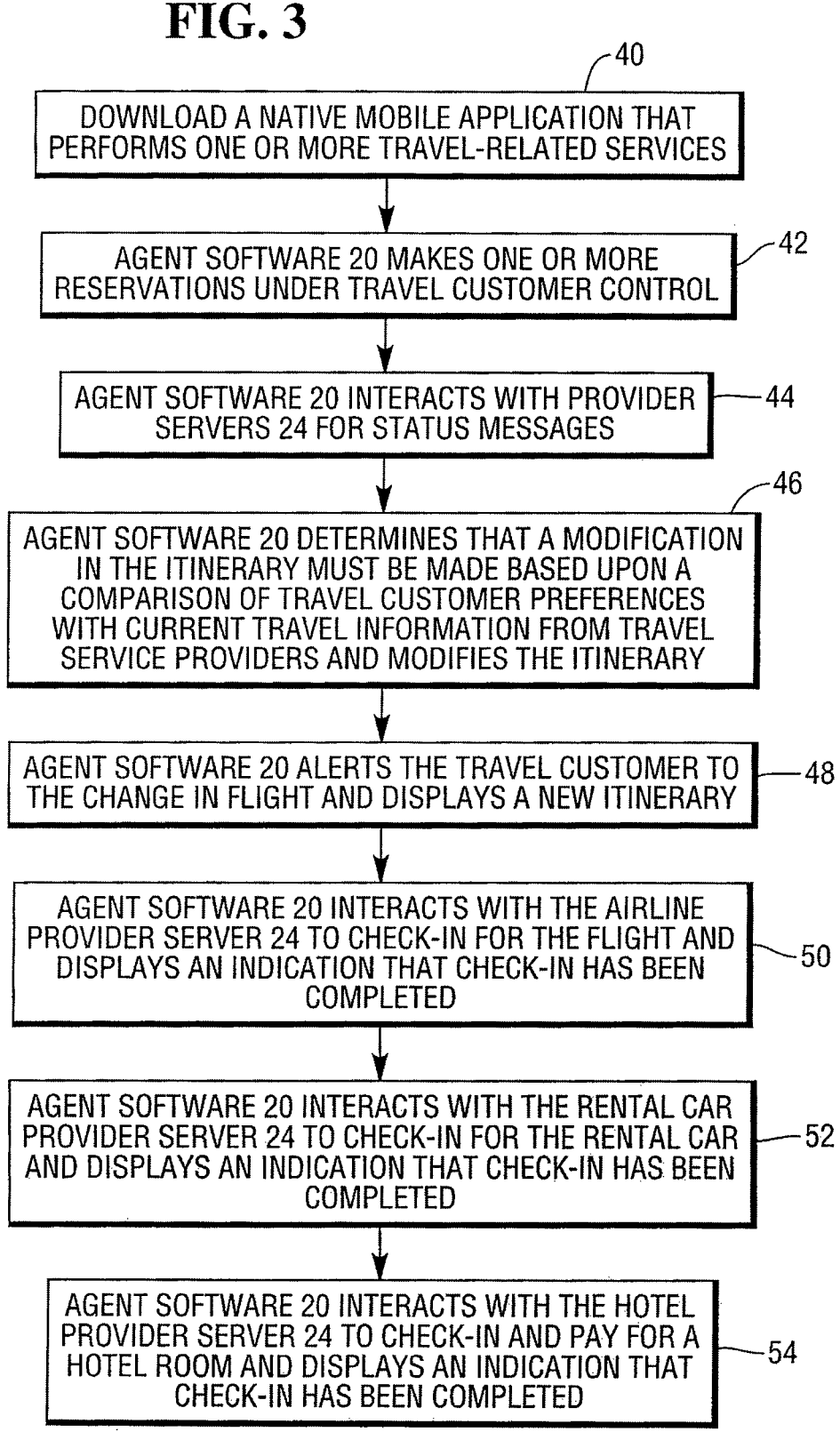

SYSTEM AND METHOD OF COMPLETING AN ACTIVITY VIA AN AGENT

CROSS-REFERENCE TO RELATED APPLICATIONS

This application claims priority to U.S. Application Ser. No. 61/792,815, filed Mar. 15, 2013 which is incorporated by reference herein in its entirety for all purposes.

BACKGROUND

The present invention relates to systems and methods of completing activities, such as transactions, and more specifically to a system and method of completing an activity via an agent.

Users desire assistance in a number of ways when completing activities using computers and communication devices, such as smartphones.

Users also desire assistance when contacting or interacting with a provider of goods or services (hereinafter referred to simply as a provider) in-person, over a telephone or through a computer.

For example, a user may be involved in one or more travel activities involving airline, rental car and hotel related activities. If a flight is cancelled by the airline, the travel user must contact the provider to make other arrangements.

It would be desirable to provide an alternative method of completing activities which employs an agent to facilitate and/or perform the activities on behalf of a user, such as when problems occur with providers.

SUMMARY

In accordance with the teachings of the present invention, a system and method of completing an activity via an agent is provided.

A user may download a native mobile application containing agent software to a smartphone. The agent software may include user interface elements based upon any user interface convention. For example the agent software may generate an avatar for display, which provides a "face" to the user. The avatar allows users to interact with the mobile application in much the same way as they would with a human agent.

The agent software may additionally be capable of reacting to the user's body language through camera input, voice inflection through microphone input, and/or other cues to adjust its virtual personality to suit the situation.

The agent software may be accessed via a smartphone or kiosk or other computing device. The agent software may respond to various types of user inputs, such as voice, touch, key, and/or mouse input. The agent software may also be capable of accepting information from other sources, such as location information from smartphones and other portable devices.

The agent software may initiate activities or respond to user input. For example, the agent software may be configured to provide alerts and/or other information to a user based upon configuration settings and information in a user profile. As another example, the agent software may respond to user requests, such as "when does my next flight depart?"

In one embodiment, the agent software may be used by a user to perform activities associated with a provider, such as perform transactions, provide reminders and other information, and assist with decision-making and problem resolution. The agent software provides information to the user and guides the user through the activities.

For example, as part of travel-related activities, the agent software may guide the user through travel disruptions and changes. The agent software may also make changes on behalf of the user based upon information in a user profile and alert the user to the changes.

An example method of completing an activity includes displaying an avatar in various forms of appearance, which may include positions and/or poses, during steps of the activity. The various forms of appearance communicate information to assist a user in completing the steps, including recording required user inputs during the steps.

The avatar may be part of a pictographic language system. The avatar may include a head, arms, and/or a body. One form of appearance may include an introductory form of appearance corresponding to a first step of the task. Another form of appearance may include an option clarifier form of appearance accompanied by choice buttons when a corresponding step requires the user to make a choice. Another form of appearance may include a clarifier form of appearance accompanied by information to explain a corresponding step.

In an example embodiment, a processor of a mobile communication device is configured to display screens during an activity including an avatar in various forms of appearance communicating information to assist a user in completing corresponding steps of the activity, and to receive required user inputs during the steps. The processor may be configured to connect to a server in order to perform the activity. Alternatively, the processor may be configured to perform the activity alone. In yet another alternative, the processor may be configured to perform portions of the activity alone, locally store results, and send the results to the server when the processor establishes a connection with the server and/or complete the remaining portion of the activity.

An example method of assisting a travel user includes completing a travel itinerary by a computer executing agent software, including displaying an avatar by the agent software to assist the travel user in making selections, receiving by the agent software information which indicates that an upcoming stage of the journey should be modified, in response to the information, modifying the upcoming stage by the agent software, and displaying the avatar to communicate a modified itinerary to the travel user.

BRIEF DESCRIPTION OF THE DRAWINGS

The drawings are only for purposes of illustrating example embodiments and are not to be construed as limiting the scope of the claims.

FIG. 3 is a flow diagram illustrating an example method of operation in accordance with an example embodiment.

DETAILED DESCRIPTION

Figure 1:
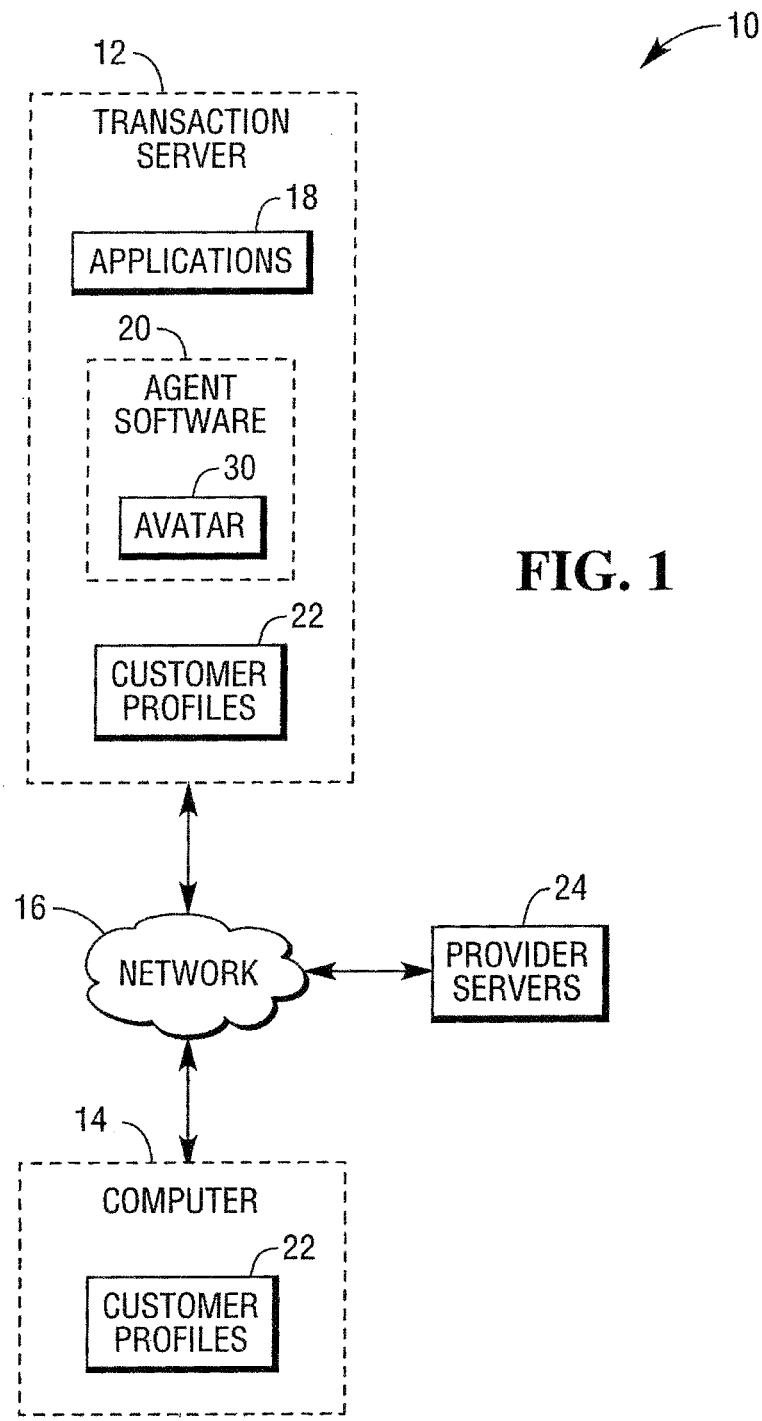
FIG. 1 is a block diagram of an example system.

With reference to FIG. 1, an example system 10 for completing activities via an agent is illustrated. The agent is embodied as agent software 20, which facilitates and/or performs activities on behalf of a user. For example, agent software 20 may monitor predetermined events, notify a user when events occur, respond to user inquiries, and intervene to perform activities. Agent software 20 may have a characteristic persona that it presents to the user in the form of an avatar 30 on a display.

In more detail, example system 10 includes a computer 14, which includes one or more processors, memory, and program and data storage. Computer 14 may execute an operating system, such as a Microsoft, Google, Apple, or Linux operating system. Computer 14 further includes network circuitry for connecting to a network 16, via wire and/or wireless, and other circuitry for connecting to one or more peripherals, such as an input device and display (e.g., a touch overlay to the display), a camera, sound circuitry and a microphone. For example, computer 14 may include Universal Serial Bus (USB) circuitry and/or Bluetooth standard circuitry. Computer 14 may further include location determining circuitry, such as global positioning satellite (GPS) circuitry.

Computer 14 may include, but not be limited to, a kiosk, a personal computer, a portable computer, or a mobile computing/communication device, such as a smartphone, tablet, or personal digital assistant.

Computer 14 executes other computer software that may be stored in a computer readable medium. For example, computer 14 executes application software 18 and agent software 20. Computer 14 may locally store and execute one or more of applications 18. Alternatively, computer 14 may execute applications 18 from server 12, which may host applications 18 as services "in the cloud".

Applications 18 may be modular nature. Each application 18 may perform a specific function, but each application may interact with other applications in servicing the user.

For example, a software module/application 18 dedicated to airline flight rebooking (re-accommodation) would receive information passed from other applications 18, such as a check-in application and from agent software 20.

Users establish accounts or memberships with the entities associated with server 12 and provider servers 24.

Server 12 includes one or more computers each having one or more processors, memory, and program and data storage. Server 12 may execute an operating system such as a Microsoft or Linux operating system. Server 12 further includes network circuitry for connecting to network 16, and may include other circuitry for connecting to peripherals. Server 12 may include a web server connected to the World Wide Web (WWW or "web") and provide web content, including web pages.

Server 12 may interact with servers 24 of different providers via network 16. For example, server 12 may interact with an airline server, a hotel server, and/or a rental car server during booking of a new flight following cancellation of a scheduled flight, in order to change a hotel reservation or a rental car reservation.

Server 12 may perform additional functions identified in published U.S. application Ser. No. 12/508,998, filed Jul. 24, 2009, and entitled, "System and Method of Managing User Information", which is hereby incorporated by reference in its entirety.

Network 16 may include any combination of wired and wireless networks, and may include a global communications information network, also known as the Internet.

Agent Software

Agent software 20 acts as an intermediary or agent "behind the scenes". Agent software 20 may act alone to perform activities or in concert with cloud-based applications 18. Agent software 20 conducts activities on behalf of the user. For example, agent software 20 may monitor predetermined events, notify a user when events occur, respond to user inquiries, intervene when problems occur, and react to the problems in real time.

Agent software may be accessed via any type of computer 14. Agent software 20 may respond to various types of user inputs, such as voice, touch, key, and/or mouse input. The agent software may also be capable of accepting information from other sources, such as location information (e.g., global positioning satellite (GPS) information) from, for example, smartphones.

Agent software 20 relies on locally available and/or stored information, such as user preferences in profiles 22. Alternatively or in addition, agent software may rely on information and/or user preferences stored at server 12. Agent software 20 understands relationships between activity information from various sources, including server 12 and provider servers 24.

Profiles 22 may contain information such as providers of interest, user names and passwords for logging into server 12 and selected provider servers 24, user preferences for selected providers, provider loyalty program information (e.g., frequent flyer number), and other information specific to a purpose.

For example, when used in connection with a travel transaction, profile 22 may include third party contact information. If a user is traveling and delayed, agent software 20 may send messages to friends, relatives, business contacts, or anyone else the user has identified in profile 22.

Agent software 20 manages and stores a digital wallet. A digital wallet includes payment information, such as credit card information, for making purchases from providers.

In the travel context, agent software 20 also manages and stores itineraries. Itineraries include airline, car rental, hotel, and other travel reservation information.

Agent software 20 monitors provider information for flight cancellations and other events during the user's journey and reacts by conducting activities on behalf of the user in accordance with preferences in the user's profile 22. Agent software 20 may recognize itinerary elements, such as flight, hotel room, and rental car details. Agent software 20 may also consider calendar, contacts, and other personal information. Agent software 20 may compute a travel event sequence and respond to changes or interruptions while balancing trade-offs between available choices. For example, agent software 20 may determine the impact of a flight delay on other travel activities, such as a hotel or other reservation.

Agent software 20 works with existing calendar and contact applications executed by computer 14 where practical. For example, a small extensible markup language (XML) code snippet, recognizable by agent software 20, may be added to contacts in Microsoft Outlook software, to facilitate quick flagging of contacts by agent software 20.

Agent software 20 also works to provide information back to providers. This information can take the form of structured data exchanges between systems or even simple voice calls.

Using peripherals associated with computer 14, agent software 20 may also be capable of reacting to the user's body language (through analysis of camera images), voice inflection (through analysis of microphone recordings), touch input method (through analysis of touch inputs), and other cues to adjust its virtual personality to suit the situation.

Agent software 20 is designed to be part of an open platform, encouraging other software developers to write to the same specification for the purposes of extension. For example, in a travel context, travel providers and any other services useful to the travel user can leverage the platform. Information from these external sources may be fed back into agent software 20 to improve its ability to make decisions on behalf of a travel user.

Avatar

Agent software 20 may have a characteristic persona that it presents to the user in the form of an avatar 30. When users need to interact with applications 18, avatar 30 facilitates the interaction in much the same way as a human agent, but graphically. Avatar 30 may be presented as images or a sequence of images. In an example embodiment, an animated avatar 30 may also communicate in a particular language with known cultural idiosyncrasies based upon identification information provided by the user or the user's profile 22. Agent software 20 may provide corresponding aural messages.

Figure 2:
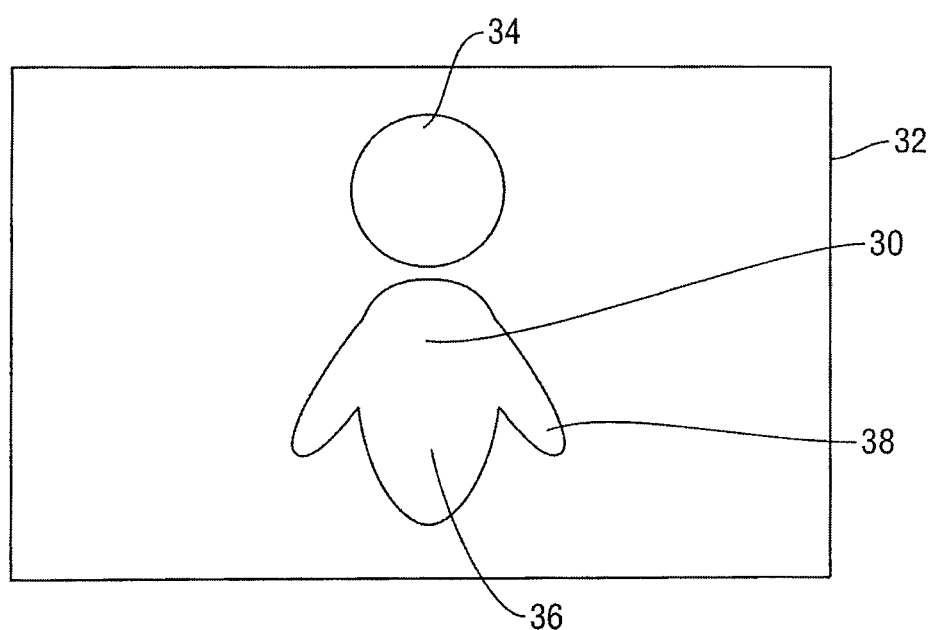
FIG. 2 is a screen shot illustrating an example avatar used in accordance with an example embodiment.

Referring now to FIG. 2, one type of avatar 30 is described in U.S. patent application Ser. No. 13/739,474, filed Jan. 11, 2013, and entitled, "Techniques for Transacting via an Animated Assistant," which is hereby incorporated by reference in its entirety.

Computer screen 32 illustrates an example avatar 30, which includes head 34, body 36, and arms 38 in different positions, which may include poses, for communicating information. Head 34 may be circular in shape. The length of body 36 may be one and a half times the diameter of head 34. The thickest point of body 36 may be equal to the diameter of head 34. The distance between the bottom of head 34 and the top of body 36 may be an eighth of the diameter of head 34.

The length of arms 38 may be equal to the diameter of head 34. The thickness of arms 38 may be equal to a eighth of the diameter of head 34. The width of each arm 36 at its middle point may be equal to three eights the diameter of head 34. The distance between the centerline and the beginning of arms 38 may be one fourth of the diameter of head 34. The top of arms 38 may be at an eighth of the diameter of head 34 from the top of body 36.

In this example, avatar 30 is part of a pictographic language system which is intended to communicate information to a user without regard to the gender, literacy level, spoken language or technical competence of the user. The pictographic language system addresses challenges associated with offering complex technology-based services to emerging markets where user capabilities, such as language literacy, are extremely limited.

The pictographic language system specifically addresses communicating with a user, including where the user does not speak the local language, the user does not read the local language, the user does not read their spoken language, the user is not accustomed to using self-serve technology, the user is not accustomed to using computers or smartphones and the user fears and/or does not trust technology-based services.

The pictographic language system has avatar 30 positioned in different pre-established ways alone and/or with other symbols to facilitate communication. The number of symbols may be determined by the familiarity and type of service. Example design guidelines may include the following:

1. A pictographic sequence may include four steps, intro step, option clarifier, clarifier, and conclusion. Every sequence may include the intro step and conclusion. The option clarifier may be only needed if the service has multiple options, and showing that there are options is critical to the user's understanding. The clarifier may be needed when the other three steps are insufficient to explain the service. If the option clarifier is not included the clarifier must be included. If the clarifier is not included the option clarifier must be included. In one example, three may be the minimum number of symbols to be used and four may be the maximum.
2. Branching involves an option clarifier. The use of an option clarifier causes the preceding symbols in the sequence to follow one of the services shown. Of the possible services that can be displayed on the symbol, the narrative may follow the one that is most frequently used by the user population. It is important to note that when people of multiple literacy levels are using computer 14, the service displayed may reflect the one that the population with the lowest literacy level uses the most frequently.
3. A speed bump is a device that slows cognitive processing. In pictographic sequences speed bumps cause users to take a longer time to interpret meaning, increasing their likelihood to correctly identify unfamiliar services. The choice to eliminate or incorporate speed bumps may be based on the user's familiarity with each service.
4. When familiar symbols are used they cause the user to jump to a conclusion, i.e., into a "rabbit hole". After this happens the user forces all of the preceding symbols to fit their assumption. This is beneficial when the service is familiar—it will lead to faster processing time. Preceding symbols will be interpreted correctly. If the service is unfamiliar this can be destructive to the user's understanding. Jumping to a conclusion of an unfamiliar service will cause them to conclude incorrectly.
5. A cognitive lure is a device that draws users into a deeper state of cognitive processing. This may be done by depicting symbols that cause users to empathize with avatar 30. The user's empathy for avatar 30 gives them motivation to solve her problem, which is much like their problem. Agent software 20 and the user may both need to figure out what this service is. This causes the user to think more critically about what each symbol means and then makes a final conclusion based on all symbols in the sequence.

Example Method of Operation

With reference to FIG. 3, a travel user causes a smartphone to download a native mobile application that performs one or more travel-related activities in step 40. The mobile application includes agent software 20 with avatar 30 (FIG. 4A-4F). The mobile application may be unique to, and be provided by, a single travel provider (e.g. one airline). Alternatively, the mobile application may be developed by a third party for use with more than one provider (e.g. airlines) or more than one type of provider (e.g., airlines and hotels). The travel user uses the mobile application to conduct activities when disconnected from or when connected to one or more services "in the cloud". Agent software 20 acts as a bridge between the travel user and providers.

For example, a travel user may perform some activities using the mobile application without requiring a connection to a provider server 24. The smartphone completes such activities using information locally stored in the smartphone. The mobile application later sends any required information to a provider server 24 when a connection is established. For other activities, the mobile application may require a connection.

Figure 4A:
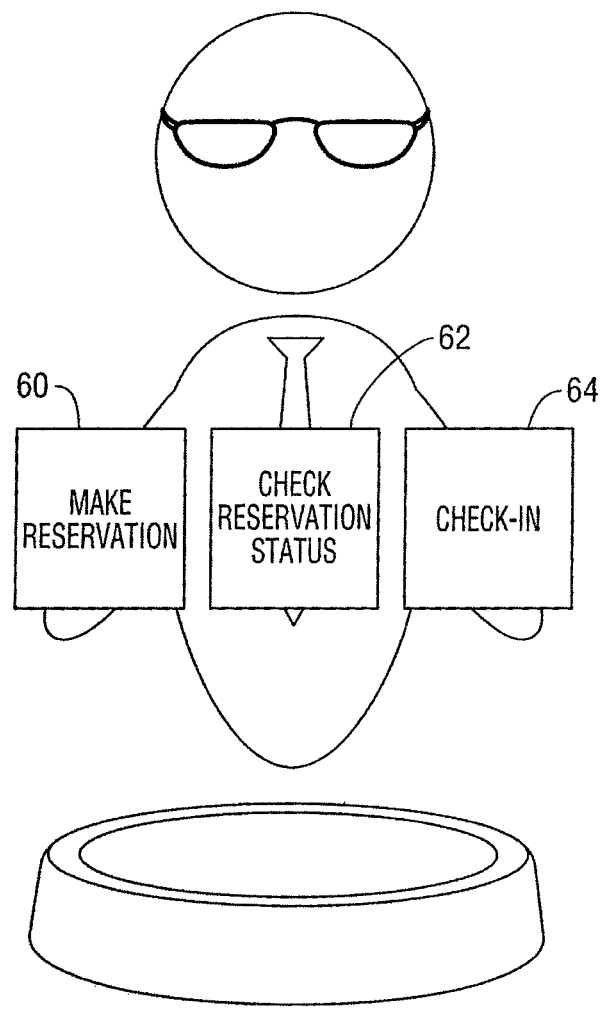
FIGS. 4A-4F illustrate elements of activity screens of a computer during the example method of operation in accordance with an example embodiment.

With reference to FIG. 4A, an example screen shows avatar 30 holding three buttons associated with three transaction choices, including a make reservation button 60, a check reservation status button 62, and a check-in button 64. Avatar 30 may shake each button to prompt a user to choose. Further, avatar 30 may nod following a travel customer selection of one of buttons 60-64 to convey acceptance of a selection.

In step 42, agent software 20 makes one or more reservations under travel customer control. Example reservations include airline, rental car, hotel, and/or other services.

Figure 4B:
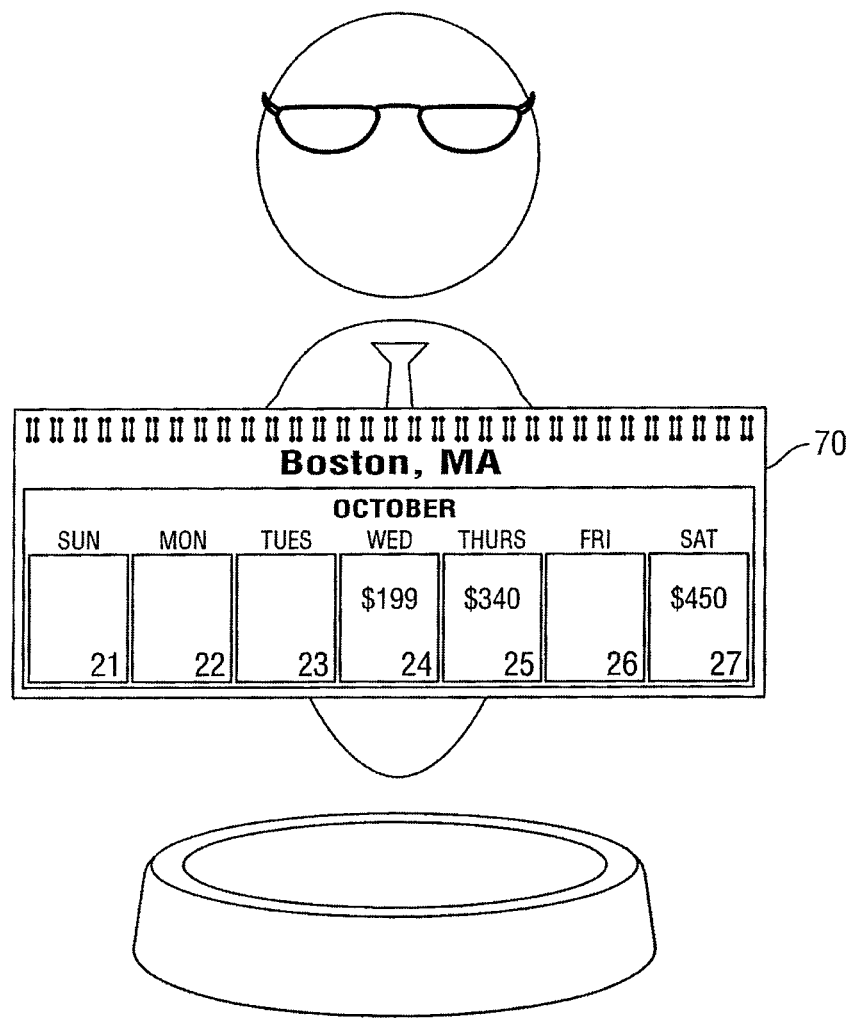
Figure 4C:
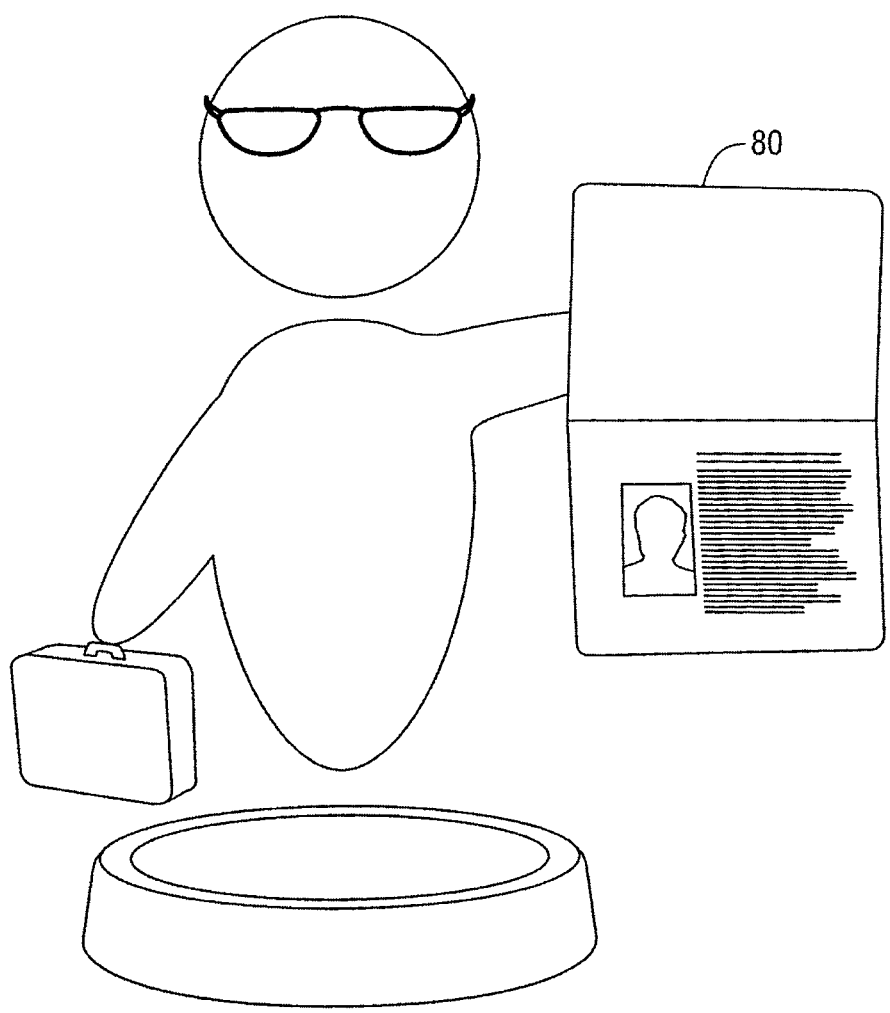

The travel customer selects make reservation button 60 held by avatar 30 by touching the screen of the smartphone over button 60. Avatar 30 may then display a calendar 70 showing dates with cost information (FIG. 4B). The travel customer then selects one of the date/cost combinations by touching the screen of the smartphone over the selected date/cost combination.

Agent software 20 may leverage information that a travel customer would desire in making a journey. That information may include Information from travel providers used during the journey (e.g. airline flight status), information needed to conduct a transaction (e.g. purchase an upgrade), information incidental to the travel customer's journey (e.g. weather, traffic), information related to the purpose for the journey (e.g. meeting location and other individuals known to the travel customer making the same journey).

The degree of personal involvement by the travel customer can vary based upon preferences in profile 22. Agent software 20 is capable of using preference information in profile 22 to make decisions on behalf of the travel customer. Agent software 20 may update profile 22 after each activity as "learning" so that it can make decisions based upon past experience. Regardless, avatar 30 makes tasks easier and more intuitive.

Figure 4D:
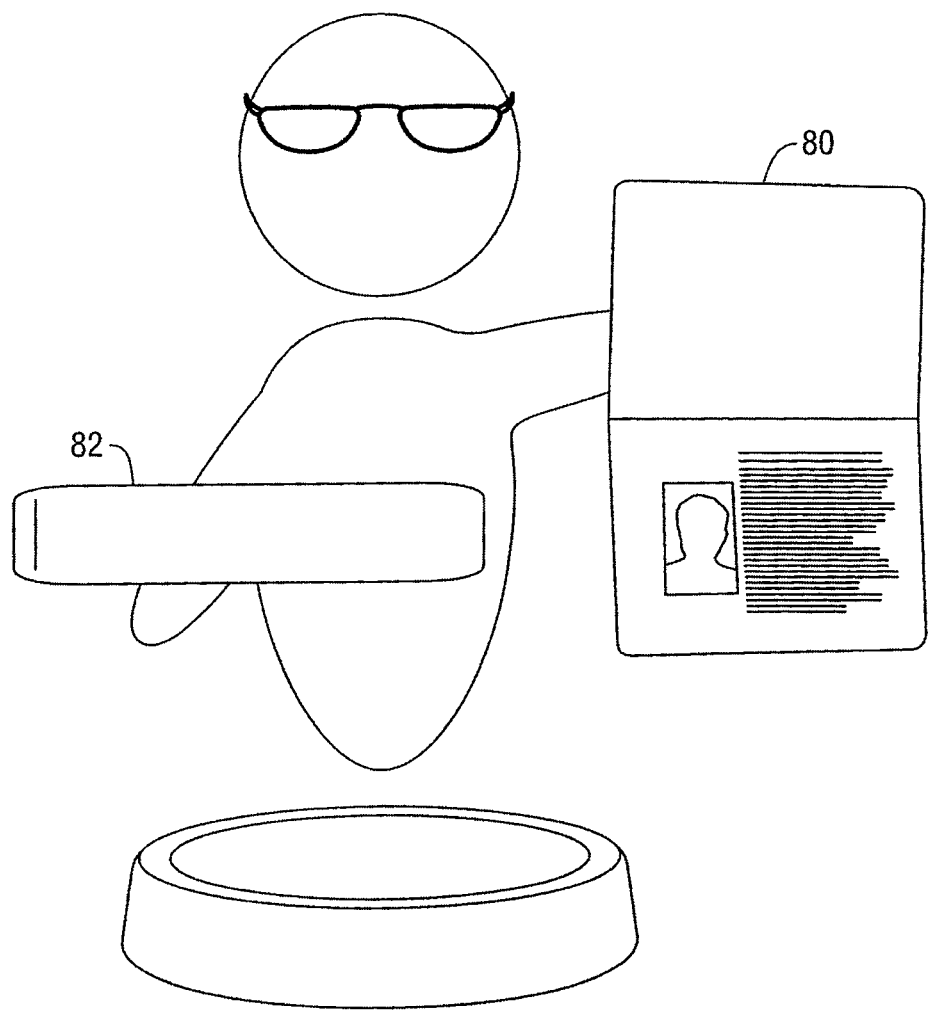

For example, agent software 20 assists the travel customer in completing the details of the itinerary and payment, and arranges all stages, including transport to an airport, the flight reservation, the rental car reservation upon arrival, and the hotel reservation. Avatar 30 makes the process more intuitive to the travel customer. Using graphics-based dialogues including avatar 30, agent software 20 prompts the travel customer to input the relevant information. For example, agent software 20 may display avatar 30 pulling out a passport 80 from a briefcase and holding the passport (FIG. 4C), with a subsequent customer input 82 to enter the passport information into the mobile application (FIG. 4D).

Alternatively, the travel customer may provide only necessary pieces of information to agent software 20 and then agent software 20 provide the details for the reservations.

For example, the travel customer may using the mobile application enter a desired arrival time at a hotel in a specific destination city on a specific date. Agent software 20 obtains the current location from profile 22 and makes all necessary flight and rental car arrangements. Agent software 20 may then provide payment when required from the travel customer's digital wallet.

Figure 4E:
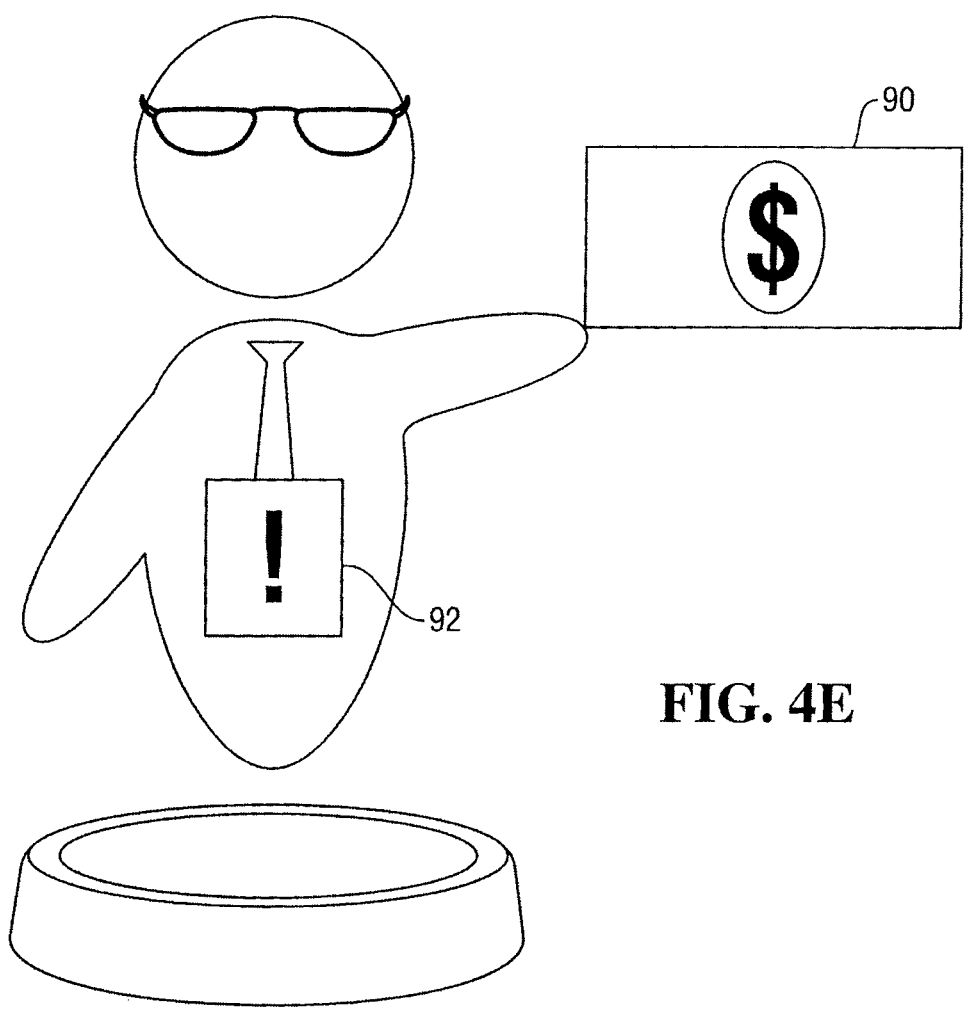

As another example, agent software 20 may cause avatar 30 to display a dollar or other currency symbol along with a question mark, prompting the travel customer to approve a payment (FIG. 4E). The payment method may be either input by the travel customer or stored in the system within a passenger profile 22 or digital wallet or other such storage method.

In step 44, agent software 20 interacts with provider servers 24 for status messages. For example, agent software 20 obtains flight status information from an airline provider server 24 by selecting check reservation status button 62 in FIG. 4A.

Agent software 20 acts as a "trip monitor" and is capable of recognizing itinerary elements such as flights, hotel room details, etc., and initiating actions without first receiving travel customer input. From available data, agent software 20 can compute a travel event sequence, alert the travel customer to predetermined events, respond to changes or interruptions, and request travel customer input, when necessary.

Figure 4F:
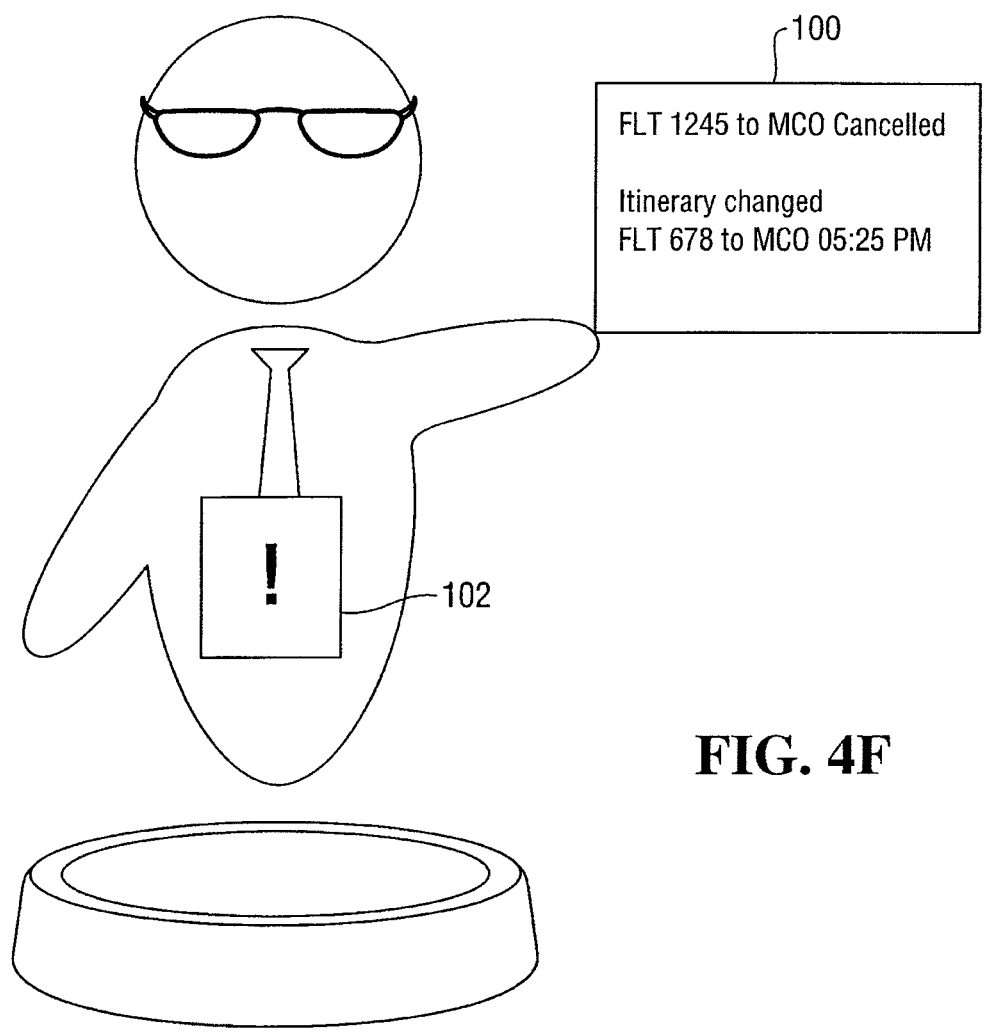

If agent software 20 detects no expected modifications to any stages of the itinerary, then the travel customer follows the itinerary as originally planned. If, on the other hand, agent software 20 receives information that a stage is expected to be modified, as when the planned flight will be cancelled, agent software 20, through one or more applications 18, modifies the stage, as by booking another flight. When agent software 20 acts on behalf of the travel customer to modify the itinerary, avatar 30 communicates that a change has been made through a series of icons and dialogues. For example, avatar 30 may display an exclamation point with a button 100 to display details. When pressed by the travel customer, the changed information is displayed in a box 102 for review (FIG. 4F).

Agent software 20 may actively pursue such information, as by periodically contacting the airline provider server 24, and inquiring whether the flight is expected to be timely. Alternately, the airline, or other provider of a stage, can notify agent software 20 if a deviation from the scheduled flight is expected to occur. For example, the airline can send an e-mail message.

In step 46, agent software 20 determines that a modification in the itinerary must be made based upon a comparison of travel customer preferences with current travel information from travel providers and modifies the itinerary. Agent software 20 may make new travel arrangements without involving the travel customer. Alternatively, agent software 20 may alert the travel customer and walk the travel customer through possible selections provided by agent software 20 as in step 42. When agent software 20 acts on behalf of the travel customer to modify the itinerary, avatar 30 communicates that a change has been made through a series of icons and dialogues. For example, avatar 30 may display an exclamation point with a button to display details, similar to FIG. 4F. When pressed by the travel customer, the changed information is displayed for review.

Modifications may be based upon events, such as flight cancellations; however, actual cancellation may not be required for obtaining a substitute itinerary.

Agent software 20 may obtain a substitute flight based upon receipt of the report of a three hour expected delay. Avatar 30 may communicate information to the travel customer more promptly than the travel provider.

As another example, if an airline reports a three hour delay on a heavily traveled day, a business rule within agent software 20 may define this event as being eligible for proactive modification. In other words, agent software 20 may apply a different set of rules for certain circumstances so as to minimize the impact of travel disruptions upon the travel customer.

Making new travel arrangements involving modifications to one travel stage may require modifications of other stages. For example, a new flight reservation may require a change in rental car arrangements. Agent software 20 detects the need for this change by consulting profile 22 for travel customer preferences involving, for example, acceptable limits on delays, such as the layover delay, limits on costs, limits on time-durations of travel stages, limits on distances between hotels and sites to be visited during other stages, etc. Avatar 30 may communicate these change events through a combination of graphic and dialogues.

Agent software 20 may also be used to bridge the gap between one travel supplier and another. For example, agent software 20 may notify a hotel provider when a travel customer will be arriving a day later based upon location and other information provided from the travel customer's smartphone to the hotel provider's server.

A version of agent software 20 and avatar 30 may be incorporated into travel agent and provider software, providing the same level of non-verbal communication enjoyed by the travel customer to providers.

In step 48, agent software 20 alerts the travel customer to the change in flight and displays a new itinerary.

In step 50, agent software 20 interacts with the airline provider server 24 to check-in for the flight and displays an indication that check-in has been completed.

In step 52, agent software 20 interacts with the rental car provider server 24 to check-in for the rental car and displays an indication that check-in has been completed.

In step 54, agent software 20 interacts with the hotel provider server 24 to check-in and pay for a hotel room and displays an indication that check-in has been completed.

Additional Example Activities

In a first example transaction, a travel user is departing from JFK airport when a flight is canceled. Agent software 20 recognized the cancellation was departing from JFK and knows that there are other metropolitan airports in the area that could be available. Agent software 20 identifies an eligible flight departing from Newark (EWR) and searches for transportation between JFK and EWR. Agent software 20 knows the travel user's preference is for speed and minimal wait, so agent software 20 chooses a helicopter flight for $150 over a 3 hour drive in traffic in a $75 town car. Agent software 20 confirms the new flight and stores a boarding pass on the travel user's smartphone, selecting the preferred seat and requesting an upgrade on behalf of the travel user. Finally, agent software 20 uses avatar 30 to communicate all of the relevant details to the travel user in clear, simple dialogue with the help of icons and graphics where useful.

In a second example transaction, a travel user is making a trip to Atlanta for a business meeting. Agent software 20 looks at the travel user's calendar and contact list. Agent software 20 consults other itineraries registered in the system and compares them with the travel user's list of preferred contacts. If a match is found, agent software 20 alerts the travel user that a preferred contact is traveling on the same flight or will be at the same meeting and offers to make dinner arrangements. If accepted, agent software 20 extends an invitation to the other travel user via that individual's own version of agent software 20.

In a third example transaction, a travel user asks agent software 20 to make dining reservations for a user meeting. Agent software 20 looks out at the period in question, compares prospective restaurant menus against the travel user's preferences, and checks to ensure the selected location has availability and accepts the travel user's corporate credit card.

In a fourth example transaction, a travel user's flight is canceled. Agent software 20 knows that the travel is at her home airport and that the travel user's preference is to rebook travel for the next day. In addition to making the flight and rental car changes, agent software 20 recognizes that the hotel's booking system requires verbal confirmation of last minute hotel changes. Agent software 20 dials the hotel directly, and in a synthesized voice, carries on a reverse-automated voice response conversation with a hotel agent such as: "I am an agent, calling on behalf of Susan Jones who has a reservation for tonight. The confirmation number is ABC123. Susan Jones' flight is canceled and she would like to cancel tonight's hotel reservation. Susan is expected to arrive tomorrow and keep the rest of her reservation. If you have questions, please contact Susan directly at 212-555-1212. Do you understand?" If the agent replies "Yes" then agent software 20 notifies the travel user that the change was successful.

In a fifth example transaction, a travel user speaks to agent software 20: "Agent, don't seat me next to a talker if the airline offers social network integration." The travel user may set a tolerance for certain duration. Agent software 20 records the instructions and attempts to comply in making the reservation.

In a sixth example transaction, a travel user is assigned a non-preferred seat due to lack of availability. Agent software 20 can reach out in gate area for other agent software users that might want to exchange seats. When a willing trade is found, agent software 20 communicates with the travel provider that people wanting to change seats. If the travel provider agent cannot accommodate they can put out incentive to others on flight to switch seats in exchange for loyalty points, miles, or some other perk. This incentive is transmitted from the travel provider to travel users by agent software 20. In a similar fashion, agent software 20 can also transmit a request for seat companionship.

In a seventh example transaction, a travel user arrives in advance of the car rental being ready. Agent software 20 notifies the travel user of the delay. In order to expedite the rental preparation, agent software 20 also notifies the agency that the travel user is in the vicinity.

In an eighth example transaction, agent software 20 recognizes that two co-workers are traveling together. Agent software 20 finds locations nearby to return a second car if the two co-workers combine to use the same car after pickup.

Although the present invention has been described with particular reference to certain preferred embodiments thereof, variations and modifications of the present invention can be effected within the spirit and scope of the following claims. For example, the invention has applicability to other transaction environments in addition to travel.

What is claimed is:
1. A method of completing an activity using a mobile communication device comprising:
providing, by executable instructions that execute on a processor of a mobile communication device from a non-transitory computer-readable medium as agent software, a user interface;

providing, by the agent software, interface elements within the user interface as an avatar presented on a display of the mobile communication device within screens, the avatar interacts with a user that operates the mobile communication device and guides the user in performance of an activity;

displaying, by the agent software through the interface elements on the screens, the avatar within the screens with the avatar having a body with a head and arms in different poses, including poses with symbols, during steps of the activity on the display within the screens;

processing the agent software on the mobile device by displaying the avatar in the poses that pictographically communicate information to assist the user in completing the steps without communicating any spoken language to the user by:

displaying the avatar on the display with the symbols in the poses as a pictographic sequence comprising at most four steps representing an introduction appearance, an option clarifier appearance, a clarifier appearance, and a conclusion appearance;

displaying the pictographic sequence of the avatar with at least three of the four steps;

displaying a first step in the pictographic sequence with the avatar in a first pose representing introductory appearance to the user for selection of the activity;

displaying a second step in the pictographic sequence with the avatar in a second pose representing the option clarifier appearance for the activity when the activity selected in the first step includes multiple selectable options available to the user;

displaying a third step in the pictographic sequence with the avatar in a third pose representing the clarifier appearance for the activity when the option clarifier appearance associated with the second step was not displayed for the activity in the first step;

displaying a fourth step in the pictographic sequence with the avatar in a fourth pose representing the conclusion appearance for the activity indicating the activity was processed on behalf of the user;

recording, by the agent software through the interface, required user inputs during the steps in response to the information;

performing, by the agent software, other steps of the activity as an intermediary between the user and a provider without user intervention, wherein performing further includes accessing a digital wallet associated with the user during performance of a portion of the activity and providing the digital wallet as a payment for the portion;

wherein the avatar of the user interface is controlled by the agent software;

determining cues from the user by the agent software;

wherein determining comprises capturing camera images of the user and analyzing the camera images to determine user body language;

wherein determining comprises capturing microphone recordings of the user and analyzing the microphone recording to determine user voice inflection;

wherein determining comprises capturing touch inputs of the user and analyzing the touch inputs to determine user touch input method; and altering appearances of the avatar presented by the user interface based upon the cues by the agent software.

2. The method of claim 1, wherein one pose includes the introductory appearance corresponding to a first step of the activity.

3. The method of claim 1, wherein one pose includes the option clarifier appearance accompanied by choice buttons when a corresponding step requires the user to make a choice.

4. The method of claim 1, wherein one pose includes the clarifier appearance accompanied by information to explain a corresponding step.

5. The method of claim 1, wherein the activity comprises a travel activity and wherein the method further comprises monitoring, by the agent software, a travel provider and detecting events that affect an itinerary of the user.

6. A mobile communication device, comprising:

a display; and a processor configured to execute executable instructions from a non-transitory computer-readable storage medium as agent software, the agent software configured to:

provide a user interface to a user through user interface elements provided within activity screens of a display to the user to assist the user in performing an activity;

display the activity screens on the display through the user interface using the user interface elements during the activity selected by the user;

present through the user elements an avatar having a body with a head and arms in different poses, including poses with symbols communicating information to assist the user in completing steps of the activity without communicating any spoken language to the user through the mobile communication device;

receive required user inputs during the steps in response to the information, and to perform other steps of the activity as an intermediary between the user and a provider without user intervention;

present the avatar on the display with the symbols in the poses displayed as a pictographic sequence that comprises at most four steps representing an introduction appearance, an option clarifier appearance, a clarifier appearance, and a conclusion appearance;

present the pictographic sequence of the avatar as at least three steps for the activity;

present a first step of the pictographic sequence with the avatar in a first pose on the display representing the introductory appearance for user selection of the activity;

present a second step of the pictographic sequence with the avatar in a second pose on the display representing the option clarifier appearance for the activity when the activity selected in the first step includes multiple selectable options available to the user;

present a third step of the pictographic sequence with the avatar in a third pose on the display representing the clarifier appearance for the activity when the option clarifier appearance associated with the second step was not displayed for the activity selected in the first step;

present a fourth step of the pictographic sequence with the avatar in a fourth pose on the display representing the conclusion appearance for the activity indicating the activity was processed on behalf of the user; and perform the activity based on the required user inputs received through the user interface from the user during the steps, wherein in performance of a portion of the activity, a digital wallet of the user is obtained and provided as payment for a portion of the activity;

wherein the avatar of the user interface is controlled by the agent software and the agent software when executed by the processor causes the processor to:

determine cues from the user by the agent software comprising capturing camera images of the user and analyzing the camera images to determine user body language, capturing microphone recordings of the user and analyzing the microphone recordings to determine user voice inflection, and capturing touch inputs of the user and analyzing the touch inputs to determine user touch input method; and alter appearances of the avatar presented by the user interface based upon the cues by the agent software.

7. The mobile communication device of claim 6, wherein the agent software is further configured to connect to a server including a travel provider server and wherein the processor is configured to detect events that affect an itinerary of the user.

8. The mobile communication device of claim 6, wherein the avatar comprises a head, arms, and a body, and wherein the arms assume raised or lowered appearances associated with activity screen objects.

9. The mobile communication device of claim 7, wherein the agent software is further configured to download an application from the travel provider server, and to cause the processor to execute the application on the mobile communication device to complete the activity, wherein the application is configured to complete predetermined activity steps on behalf of a user, wherein the agent software is configured during processing of the application to display the activity screens within the user interface.

10. A method of assisting a travel user, comprising:

completing, by executable instructions that execute on a processor of a computer from a non-transitory computer-readable storage medium as agent software, a travel itinerary by processing actions as an intermediary between the travel user and a travel provider without intervention by the travel user;

providing, by the agent software, a user interface on the computer and displaying within the user interface user interface elements within the user display as an avatar having a body with a head and arms in different poses, including poses with symbols on a display of the computer and communicating through the avatar itinerary information to the travel user to assist the travel user in making travel selections representing a travel activity of the travel user in response to the itinerary information without communicating any spoken language to the user;

processing by the agent software the avatar by:

displaying the avatar with the symbols in the poses as a pictographic sequence that comprises at most four steps representing an introduction appearance, an option clarifier appearance, a clarifier appearance, and a conclusion appearance;

displaying the pictographic sequence with at least three steps for performing the travel activity;

displaying a first step in the pictographic sequence with the avatar in a first pose representing introductory appearance to the travel user for selection of the travel activity;

displaying a second step in the pictographic sequence with the avatar in a second pose representing the option clarifier appearance for the travel activity when the travel activity selected in the first step includes multiple selectable options available to the travel user;

displaying a third step in the pictographic sequence with the avatar in a third pose representing the clarifier appearance for the travel activity when the option clarifier appearance associated with the second step was not displayed for the travel activity selected in the first step;

displaying a fourth step in the pictographic sequence with the avatar in a fourth pose representing the conclusion appearance for the travel activity indicating the travel activity was processed on behalf of the travel user;

processing, by the agent software, the travel selections obtained during the steps from the travel user, wherein processing further includes obtaining a digital wallet of the user and processing the digital wallet as a portion of the travel selections;

receiving, by the agent software, change information which indicates that an upcoming stage of a trip should be modified;

in response to the change information, modifying, by the agent software, the upcoming stage by without intervention by the travel user;

displaying, by the agent software within the user interface, the avatar in one of the different poses with one of the symbols to communicate a modified itinerary to the travel user;

wherein the avatar of the user interface is controlled by the agent software;

determining cues from the user by the agent software;

wherein determining comprises capturing camera images of the user and analyzing the camera images to determine user body language;

wherein determining comprises capturing microphone recordings of the user and analyzing the microphone recordings to determine user voice inflection;

wherein determining comprises capturing touch inputs of the user and analyzing the touch inputs to determine user touch input method; and altering appearances of the avatar presented by the user interface based upon the cues by the agent software.

11. The method of claim 10, further comprising:

receiving by the agent software user profile information;

in response to the user profile information, modifying, by the agent software, the itinerary; and displaying, by the agent software within the interface, the avatar to communicate another modified itinerary to the travel user.

* * * * *